United States Patent
DeMarco et al.

(10) Patent No.: US 8,000,863 B2
(45) Date of Patent: Aug. 16, 2011

(54) OPEN-LOOP TORQUE CONTROL WITH CLOSED-LOOP FEEDBACK

(75) Inventors: Frank A DeMarco, East Peoria, IL (US); Brian D Kuras, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 1111 days.

(21) Appl. No.: 11/756,411

(22) Filed: May 31, 2007

(65) Prior Publication Data

US 2008/0300103 A1    Dec. 4, 2008

(51) Int. Cl.
- *G06F 17/00* (2006.01)
- *F16H 61/662* (2006.01)
- *F16H 47/06* (2006.01)
- *F16D 31/02* (2006.01)

(52) U.S. Cl. .............. 701/51; 701/54; 477/43; 477/38; 60/436

(58) Field of Classification Search .............. 701/51, 701/55, 56, 58, 54, 61; 477/37–43, 45, 53
See application file for complete search history.

(56) References Cited

U.S. PATENT DOCUMENTS

| | | | |
|---|---|---|---|
| 4,709,775 A | 12/1987 | Watanabe et al. | |
| 5,249,422 A | 10/1993 | Smith et al. | |
| 5,295,415 A | 3/1994 | Abe et al. | |
| 5,433,676 A | 7/1995 | Abe et al. | |
| 5,521,819 A * | 5/1996 | Greenwood | 701/60 |
| 5,628,187 A | 5/1997 | Gollner | |
| 5,669,850 A * | 9/1997 | Dourra et al. | 477/108 |
| 5,951,421 A * | 9/1999 | D'Herripon | 474/28 |
| 6,038,504 A | 3/2000 | Cronin et al. | |
| 6,146,308 A | 11/2000 | Taniguchi et al. | |
| 6,181,020 B1 | 1/2001 | Uchida et al. | |
| 6,223,111 B1 | 4/2001 | Cronin et al. | |
| 6,260,440 B1 | 7/2001 | Cronin et al. | |
| 6,295,497 B1 | 9/2001 | Kuras | |
| 6,385,970 B1 | 5/2002 | Kuras et al. | |
| 6,397,152 B1 * | 5/2002 | Kalweit et al. | 702/41 |
| 6,402,660 B1 | 6/2002 | Cronin et al. | |
| 6,424,902 B1 | 7/2002 | Kuras | |
| 6,497,636 B2 * | 12/2002 | Schleicher et al. | 477/37 |
| 2002/0103596 A1 * | 8/2002 | Zhu et al. | 701/115 |
| 2003/0064855 A1 * | 4/2003 | Tanaka et al. | 477/115 |
| 2007/0101709 A1 | 5/2007 | Cronin | |

FOREIGN PATENT DOCUMENTS

EP    1 277 610    1/2003

* cited by examiner

*Primary Examiner* — James P Trammell
*Assistant Examiner* — Muhammad Shafi
(74) *Attorney, Agent, or Firm* — Leydig, Voit & Mayer

(57) ABSTRACT

A variator torque control system adjusts a variator output so that the actual output torque of the variator closely matches an expected output torque. In an example, pressure values of an existing torque control map are supplemented in real time with calculated pressure supplement values based on the current operation of the variator. The pressure supplement value for each mapped pressure value may be derived based on a prior application of the same or another map value.

8 Claims, 6 Drawing Sheets

OPEN-LOOP TORQUE CONTROL WITH CLOSED-LOOP FEEDBACK

TECHNICAL FIELD

This patent disclosure relates generally to hydrostatic torque controlling transmissions, and, more particularly to a system for compensating for inaccuracies in a variator torque control map.

BACKGROUND

Many sophisticated transmission systems such as continuously variable transmissions (CVTs) employ a torque controlling element to provide a continuously variable torque or speed transmission capability. An example of such a transmission is a split torque transmission, wherein a drive train is powered by dual inputs, one of which may be a torque-controlled input, such as from a hydraulic variator. In such systems, it is generally desirable to be able to accurately control the variator such that the resultant actual operation of the system based on control signals corresponds to the expected operation.

In attempting to attain this goal, some systems utilize a calibration map or torque control map that maps an input pressure or pressure differential to an output torque of the variator. Nonetheless, under actual operating conditions, some entries in the torque control map may be erroneous due to the wear of components, play or slop in the control system, and so on, leading to an undesired discrepancy between the expected and actual operation of the system.

The foregoing background discussion is intended solely to aid the reader. It is not intended to limit the invention, and thus should not be taken to indicate that any particular element of a prior system is unsuitable for use within the invention, nor is it intended to indicate any element, including solving the motivating problem, to be essential in implementing the innovations described herein. The implementations and application of the innovations described herein are defined by the appended claims.

BRIEF SUMMARY OF THE DISCLOSURE

In one aspect, a method is provided for controlling an output torque of a variator having a hydraulic actuator responsive to an actuator pressure signal. The method of this aspect includes receiving an indication of a first desired torque from an operator interface. A plurality of parameters related to operation of the variator are evaluated and mapped to a first mapped value for the actuator pressure signal. The first mapped value is applied to the hydraulic actuator as an actuator pressure signal and a first actual output torque of the variator is measured and compared to the first actual output torque to derive a pressure supplement value. When an indication of a second desired torque is received, the plurality of parameters related to operation of the variator are reevaluated to arrive at a second mapped value for the actuator pressure signal which is then modified via the pressure supplement value to produce an adjusted actuator pressure signal.

Additional and alternative features and aspects of the disclosed system and method will be appreciated from the following description.

DETAILED DESCRIPTION

This disclosure relates to a system and method for improved variator torque control system. Using the described system, a variator output is torque-controlled so that the actual output torque of the variator more closely matches the desired output torque. Torque control mappings can be prone to inaccuracies due to operating environment variations, machine variations, tolerance changes, and so on. In one example, the described torque control system adds a calculated pressure supplement value to map values before each application thereof to improve the correlation between the desired and actual torque of the variator. Additional and alternative aspects will become apparent from consideration of the following.

Figure 1:
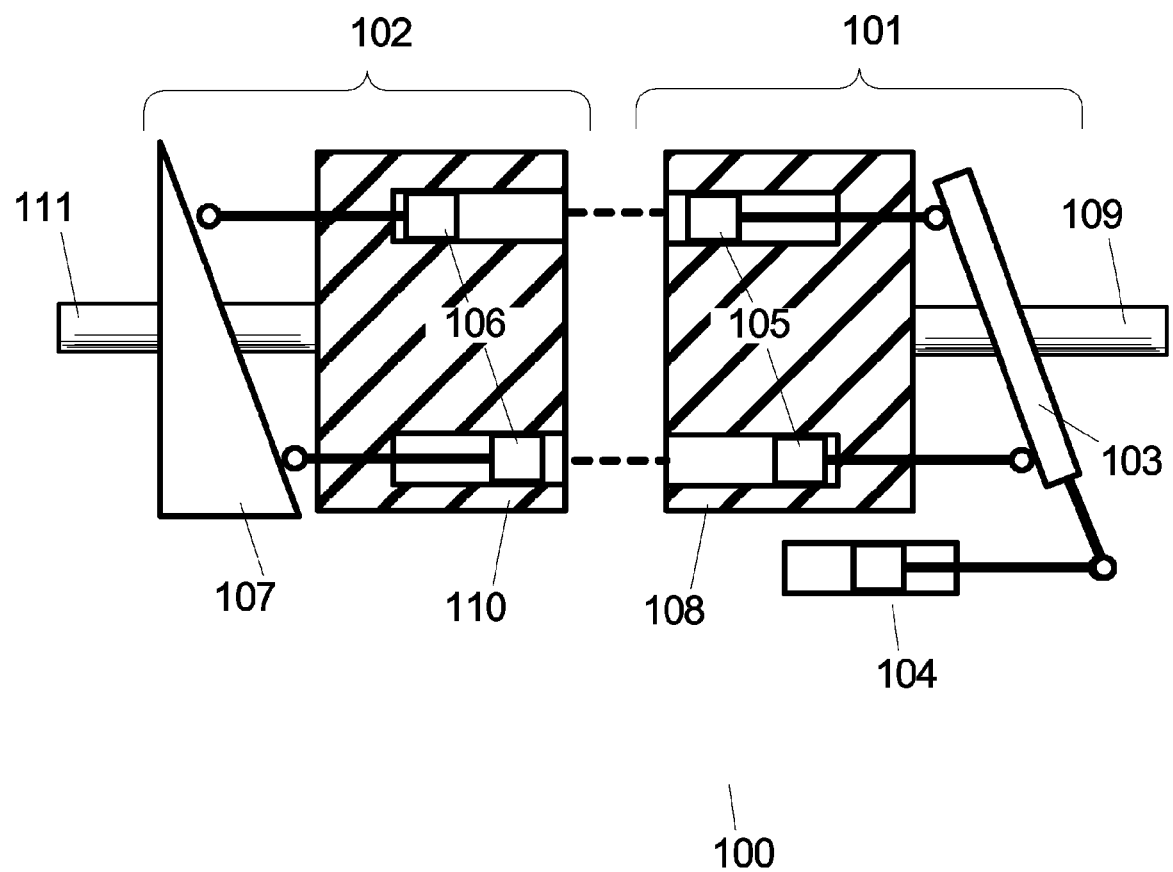
FIG. 1 is a detailed schematic drawing of a variator for providing a variable output torque based on an applied control pressure differential.

FIG. 1 is a detailed schematic drawing of a variator 100 for providing a variable output torque based on an applied control pressure differential in the swash plate actuator 104. The variator 100 comprises a pump 101 and a motor 102. The pump 101 comprises a variable angle swash plate 103 set by a swash plate actuator 104. A number of pistons 105 in respective chambers ride on the swash plate 103 via sliding contacts, such that the range of movement of the pistons 105 is set by the angle of the swash plate 103. The chambers for the pistons 105 are formed in a pump carrier 108 that is rotated via the pump input shaft 109.

The motor 102 comprises a similar arrangement including a number of pistons 106 in respective chambers. The pistons 106 of the motor 102 are slidably engaged upon a fixed swash plate 107. It will be appreciated that the angle of swash plate 107 may also be variable, so as to allow a variable displacement. The chambers of the pistons 105 of the pump 101 are in fluid communication with the chambers of the pistons 106 of the motor 102 via hydraulic fluid that fills the chambers and intervening conduits (not shown). The chambers for the pistons 106 are formed in a motor carrier 110 that rotates the motor output shaft 111. As the angle of the swash plate 103 is varied, the amount of fluid displaced by the pistons 105 of the pump 101 (and thus the fluid volume received or taken from the chambers of the pistons 106) varies.

Because of these interrelationships, the torque varies with the net force applied to the swash plate 103 and the output speed of the motor 102 varies with the angle of swash plate 103. In overview, the swash plate actuator 104, which in this example operates on differential hydraulic pressure, is driven via solenoid valves (not shown), e.g., one for each of two pressure values, controlled electronically by appropriate input signals from a transmission controller or the like. In this way, the controller can control the torque of the variator 100 via the application of electrical signals to solenoid valves associated with the swash plate actuator 104.

Figure 2:
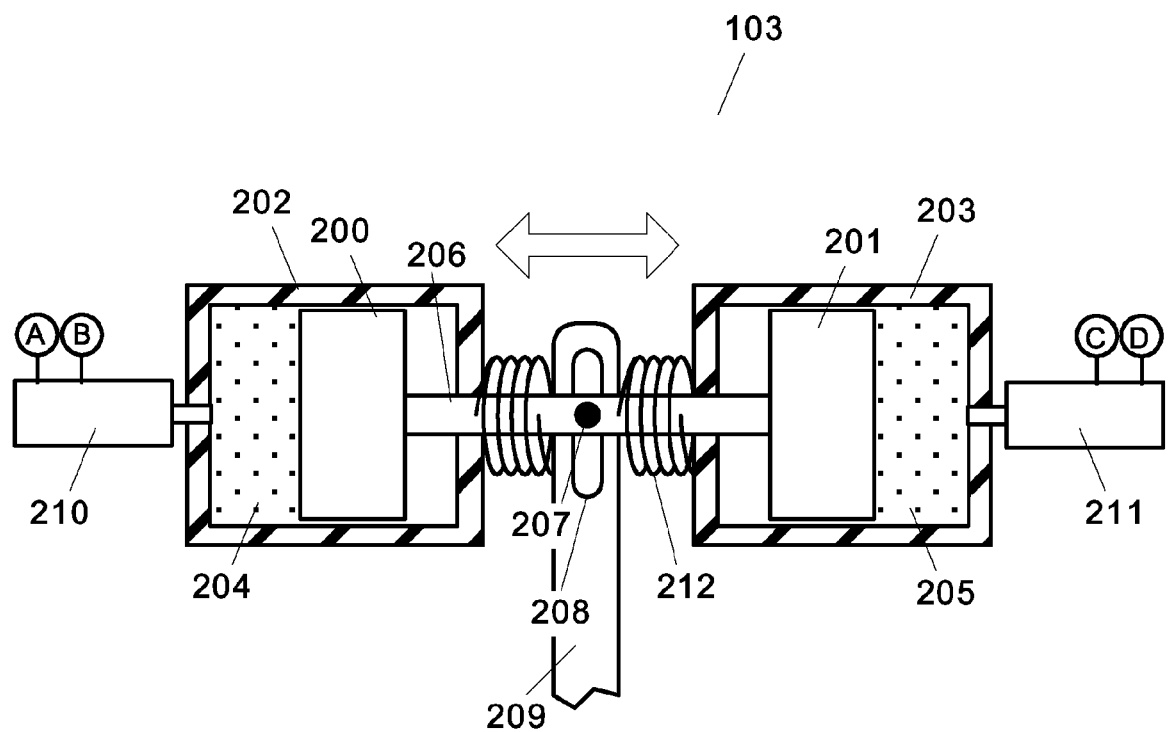
FIG. 2 is a detailed schematic drawing of a hydraulic actuator for controlling the position of a variable-angle swash plate in a variator such as that shown in FIG. 1.

FIG. 2 is a detailed schematic drawing of a hydraulic actuator 104 for controlling the actuation force on the variable-angle swash plate (not shown) in a variator 100 such as that shown in FIG. 1. The actuator 104 includes a number of interrelated elements including primarily two opposed pistons 200, 201, within respective cylinders 202, 203. The pistons 200, 201 cooperate with the bores of their respective cylinders 202, 203 to form respective pressure chambers 204, 205 for containing pressurized hydraulic fluid.

The pistons 200, 201 are joined by a bar 206 which has a central pivot pin 207 mounted thereon. The central pivot pin 207 interferes within a slot 208 in a swash plate arm 209, such that the lateral position of the bar 206 establishes the position of the swash plate arm 209 and hence the angle of the swash plate itself (not shown). The bar 206 is biased to a central position by opposing springs 212. As the bar 206 is displaced from this central position, there is a restoring force exerted by springs 212 that is proportional to the displacement.

The lateral position, velocity, and acceleration of the bar 206 is determined by the sum of the forces acting on the pistons 200, 201. The forces acting on the pistons 200, 201 are derived from the following sources: (1) pressures in chambers 204 and 205, (2) forces from the spring 212, which are a function of displacement of pistons 200, 201, and (3) swivel forces acting through the swash plate which are a function of torque, pump speed, motor speed, etc. Respective pressure valves 210, 211 independently control the pressure within chambers 204, 205. In an example, the pressure valves 210, 211 are solenoid valves that supply hydraulic fluid at a pressure that is set by an applied current within limits set by a supply pressure. Thus, in the illustrated example, each valve 210, 211 has at least a current input (illustrated as inputs A and C) and a fluid input (illustrated as inputs B and D). Typically, solenoid valves can supply fluid at any pressure between zero and the fluid pressure at the fluid input B, D.

Considering FIG. 2 in conjunction with FIG. 1, it will be appreciated that the torque supplied at output 111 is directly related to the pressure differential applied by valves 210, 211. In particular, the fluid pressure within the hydraulic circuit is related to the pressure differential applied by valves 210, 211. Thus, in torque-controlled applications, it is desirable to accurately correlate combinations of solenoid currents for valves 210 and 211 (or applied pressure differential in actuator 104) with expected associated output torques at output 111.

As a first step, a predetermined map is used to correlate specific pressure differentials with specific expected output torques. In practice, the relationship between these values also depends upon the following: (1) pump displacement of piston 104 (measured directly via a displacement sensor, or calculated by motor speed/pump speed, e.g., via normalized motor speed), and (2) input (pump) speed. Thus, a 4-dimensional mapping is used to correlate the various values.

Figure 3:
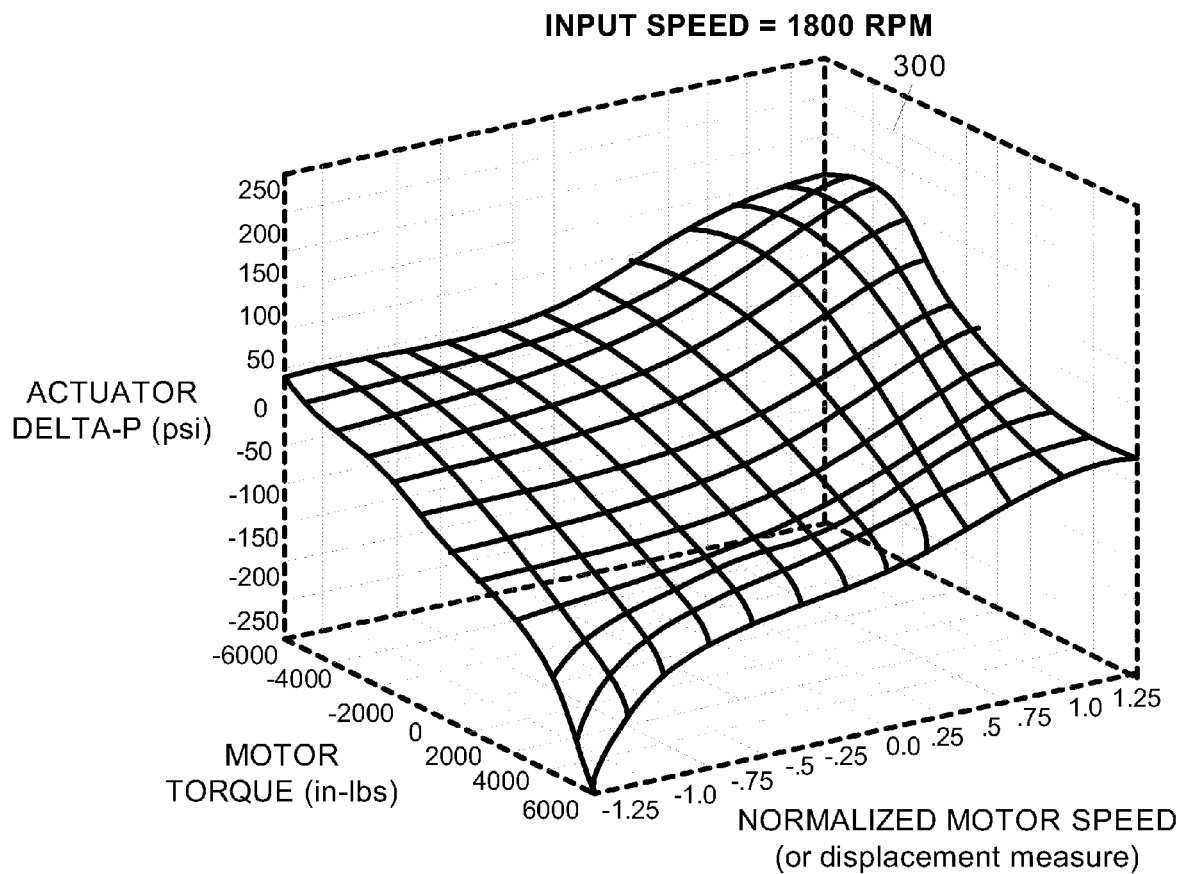
FIG. 3 is a three-dimensional section of a four dimensional map correlating actuator pressure differentials, variator input speeds and variator output speeds with expected output torques at a variator input speed of 1800 RPM.

FIG. 3 illustrates such a map with the un-shown dimension of variator input speed set at 1800 RPM. Thus, the illustrated surface 300 correlates expected output torque (left horizontal axis) with a combination of the applied pressure differential in the actuator 104 (vertical axis) and the known variator normalized motor speed or displacement (right horizontal axis, normalized). Different absolute variator input speeds would result in different 3-dimensional surfaces relating the remaining variables.

Figure 4:
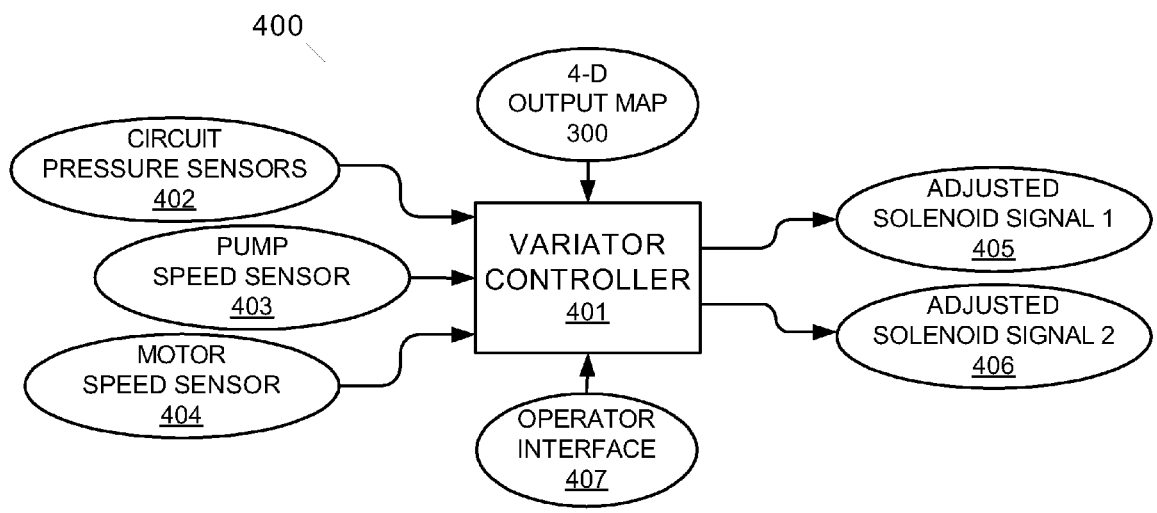
FIG. 4 is a simplified logical schematic of control components and data flow associated with an actuator to effectively control a variator.

In an embodiment, a specialized feedback loop provides a real time adjustment to the values provided by the map so that the actual torque output of the variator 100 more closely matches the desired torque. Before discussing the variator control process in detail, the control infrastructure and informational flow within the system will be discussed. FIG. 4 is a simplified logical schematic 400 of the control components and data flow associated with the mechanical components of FIG. 2 to effectively control the variator 100. In particular, a variator controller 401 is provided for controlling the operation of the variator 100 via solenoid valves 210 and 211. The variator controller 401 may be a dedicated variator controller, but more typically will also control a larger system, such as a transmission, associated with the variator 100. The controller 401 may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

In operation, the controller 401 receives a number of data inputs from the variator system 100 and provides a number of control outputs to the system 100. In particular, the controller 401 has a first data input connected to circuit pressure sensors 402 or other torque sensing devices or sensors. Although it is possible to use a single pressure sensor, it is desirable to use multiple sensors to obtain more accurate pressure readings. The circuit pressure sensors 402 are positioned and adapted to sense the hydraulic pressure within the internal hydraulic circuit of the variator 100 (i.e., between pistons 105 and 106) and to provide signals related to the sensed pressures. A second data input to the controller 401 is linked to a pump speed sensor 403. The pump speed sensor 403 is positioned and adapted to detect the rotational speed of the variator input shaft 108 and to provide a signal related to the sensed rotational input speed. A motor speed sensor 404 is linked to third data input of the controller 401. The motor speed sensor 404 is positioned and adapted to detect the rotational speed of the variator output shaft 110 and to provide a signal related to the sensed rotational output speed. It will be appreciated that the pump displacement (e.g., derived from the stroke of actuator 104) or the angle of the swash plate 103 (e.g., derived from an angle sensor) can be used as an input in place of the normalized motor speed.

In order to detect a desired torque, the controller 401 also receives a data input from the operator interface 407, e.g., an accelerator setting. The operator may be human or automated, and the operator interface may vary accordingly. The variator controller 401 also reads a 4-D output map 300 such as that shown in FIG. 3.

Based on the various available inputs as discussed above, the controller 401 calculates and provides appropriate control signals such that the variator 100 provides an output torque closely corresponding to the desired output torque. In particular, the controller 401 provides two adjusted solenoid control signals 405, 406 to control the operation of the actuator 104 and thus the operation of the variator 100. The adjusted solenoid control signals 405, 406 include a first adjusted solenoid control signal 405 to control a first one 210 of the actuator pressure valves and a second adjusted solenoid control signal 406 to control a second one 211 of the actuator pressure valves.

Figure 5:
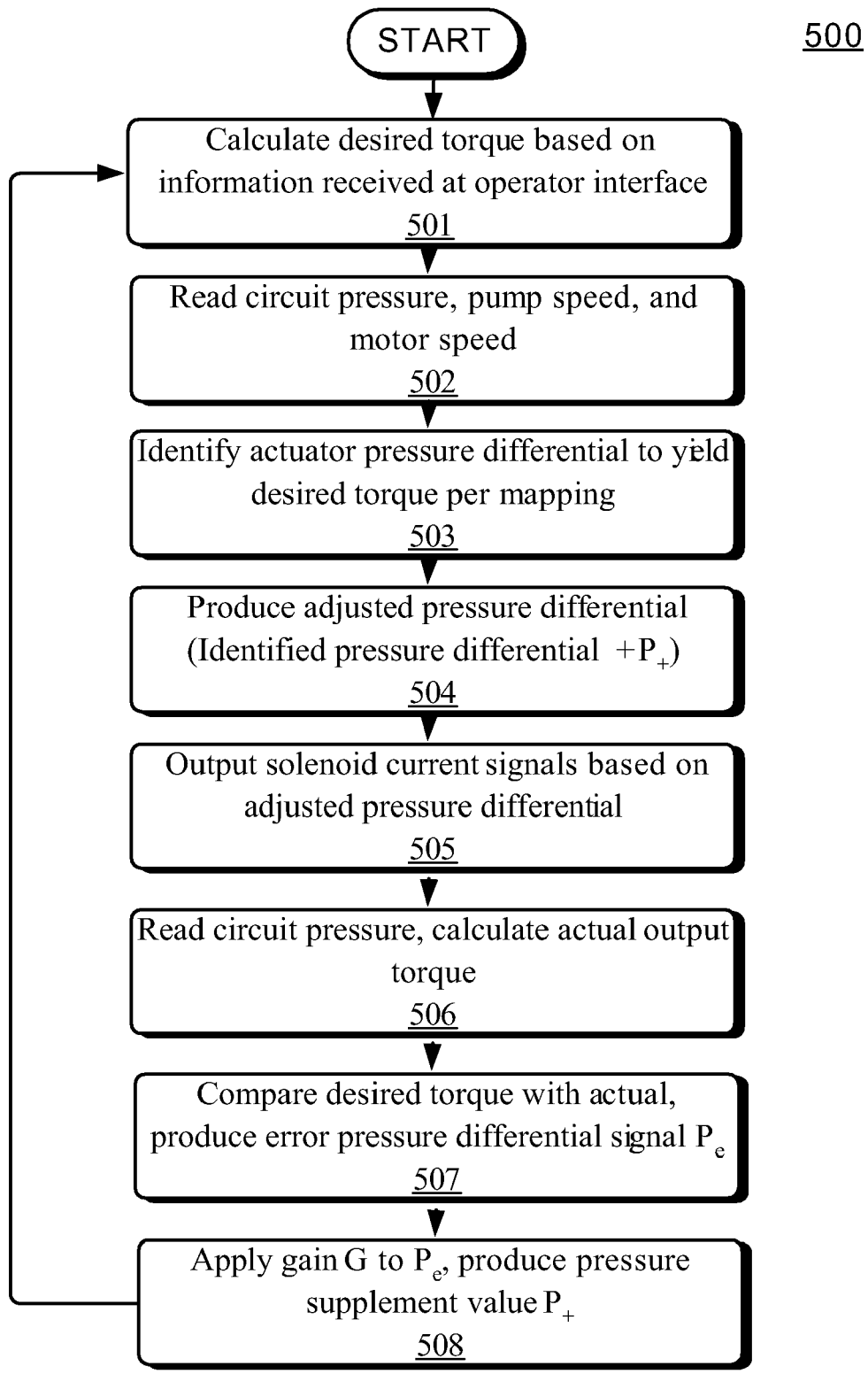
FIG. 5 is a flowchart illustrating a process for supplementing the values of a torque control map according to one example in order to improve the correspondence between actual and expected torques.
Figure 6:
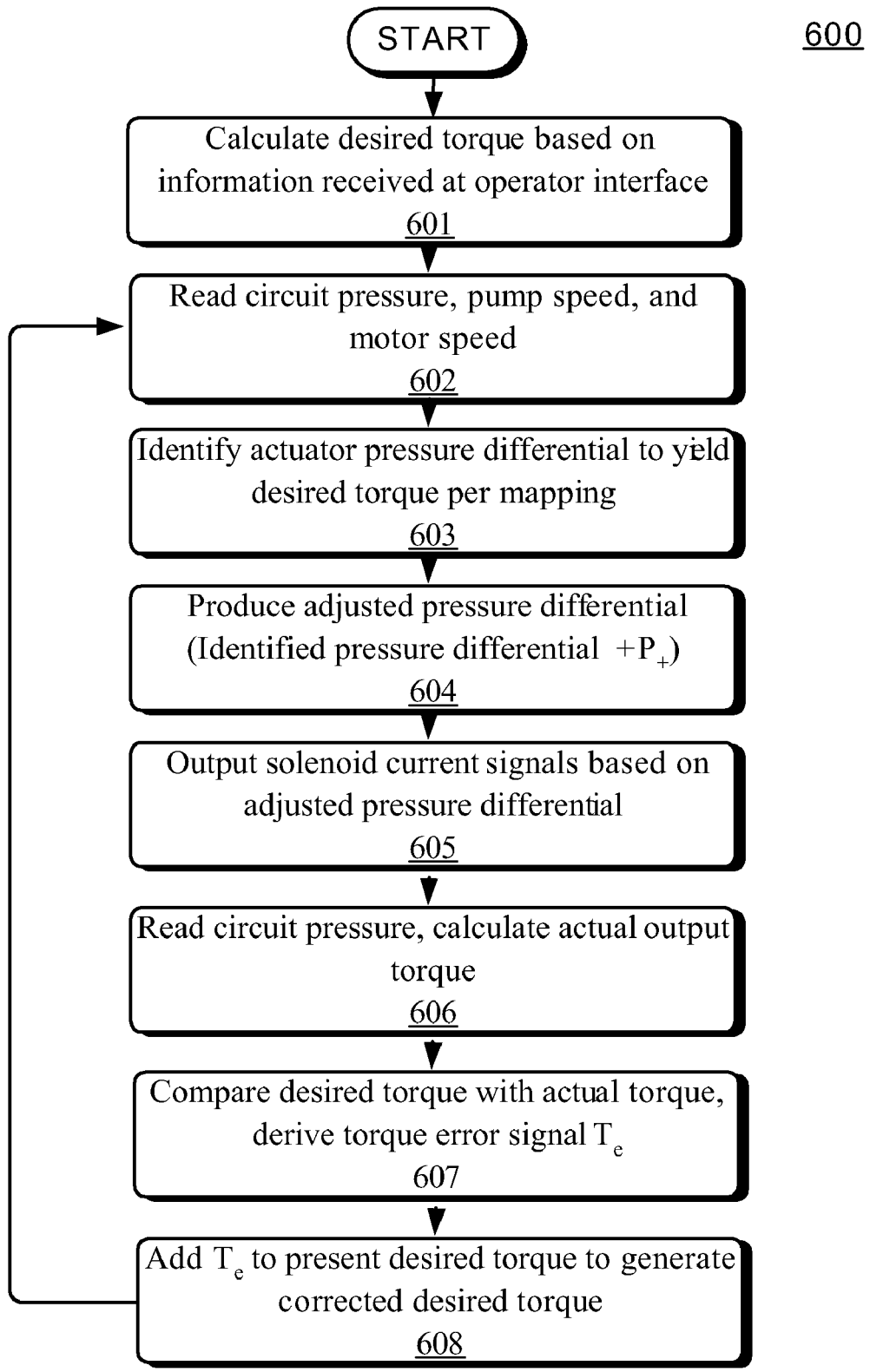
FIG. 6 is a flowchart illustrating a further process for supplementing the values of a torque control map in order to improve the correspondence between actual and expected torques.

FIG. 5 is a flowchart 500 illustrating a process for supplementing the values of the map 300 according to one example in order to improve the correspondence between actual and expected torques. In a first stage 501, the controller 401 calculates a desired torque from information received at the operator interface 407. The desired torque may be a value that is directly calculated from operator input, e.g., accelerator position, or that is indirectly calculated, e.g., from transmission operation, wherein the state of the transmission is based on current and past operator inputs. At stage 502, the controller 401 reads the variator state including the circuit pressure from circuit pressure sensors 402, the pump speed from pump speed sensor 403, and the motor speed from the motor speed sensor 404.

The controller 401 reads the map 300 at stage 503 and identifies a needed actuator pressure differential to yield the desired torque. At stage 504, the controller 401 adds a pressure supplement value $P_+$ to the identified actuator pressure differential to produce an adjusted actuator pressure differential. If the process 500 is being executed on a first pass, the pressure supplement value $P_+$ may be set at zero or an initial default offset. If the process 500 is being executed on a second or subsequent pass, the pressure supplement value $P_+$ will have been set on the prior pass in the manner discussed below.

At stage 505, the controller 401 outputs adjusted solenoid current signal 1 (405) and adjusted solenoid current signal 2 (406) based on the adjusted actuator pressure differential of stage 504. At stage 506, the controller 401 again reads the circuit pressure from circuit pressure sensor 402 and calculates the actual output torque of the variator 100. In particular, those of skill in the art will appreciate that the output torque of a variator is related to and can be directly calculated from the internal hydraulic pressure of the variator.

In stage 507, the controller 401 compares the desired torque from stage 501 with the actual torque from stage 506 and produces an error pressure differential signal $P_e$ representing the difference between the desired pressure (based on the desired torque) and the actual pressure (based on the actual torque). At stage 508, the controller 401 applies a gain G to the error pressure differential signal $P_e$ to produce a pressure supplement value $P_+$. In an example, the gain is a multiplicative gain such that $G \times P_e = P_+$. However, the nature and application of gain within the scope of this disclosure is not limited by the foregoing example. Thus, for example, it will be appreciated that the gain may be proportional, integral, and/or derivative (PID). Moreover, the gain may be variable or static, and in one example the gain G is a unitless fraction, e.g., 0.5. From stage 508, the process returns to stage 501 to again read the desired torque.

By executing the process 500, the impact of any inaccuracies in the map 300 are minimized so that the actual output torque of the variator 100 more closely matches the desired torque expressed at the operator interface. It will be appreciated that unless the gain G is set to 1 and the conditions of the variator remain largely static between passes of the process 500, the actual torque will typically not precisely match the desired torque, but the difference between actual and desired torque will generally be substantially lessened over that produced by use of the map 300 without correction. The ability to closely match the desired and actual torque is valuable in many contexts. For example, in many transmissions, input torque is controlled during shifting to ensure smooth shifts. In such contexts, the ability to produce an actual output torque that closely correlates to an expected output torque will thus enhance the quality of shifts.

In an alternative embodiment, the torque control process operates via torque command correction rather than pressure correction. This embodiment is particularly well-suited for systems wherein the correlation between torque control maps is nonlinear in one or more variables. Stages 601-606 of the torque control process 600 are similar to stages 501-506 of process 500. In stage 607, the controller 401 compares the desired torque from stage 601 with the actual torque from stage 606 and produces a torque error signal $T_e$. At stage 608, the controller 401 adds $T_e$ to a present desired torque to generate a corrected desired torque. It will be appreciated that if the desired toque from the operator interface 407 changes between the execution of stage 601 and the execution of stage 608, the new desired torque is used in stage 608. From stage 608, the process returns to stage 602 to calculate the actuator pressure differential necessary to yield the corrected desired torque. It will be appreciated that on second and subsequent consecutive passes through process 600, the corrected desired torque is used in lieu of the desired torque.

INDUSTRIAL APPLICABILITY

The industrial applicability of the variator torque control system described herein will be readily appreciated from the foregoing discussion. A technique is described wherein a variator output is torque-controlled so that the actual output torque of the variator closely matches the desired output torque. Torque control mappings are predetermined and become inaccurate due to operating environment variations, machine variations, tolerance changes, and so on. The described torque control system adds a calculated pressure supplement value to each map value before each application of that map value to improve the correlation between the desired or expected and actual output torque of the variator. In an example, the pressure supplement value is derived based on the immediately prior application of the same or another map value.

Examples of the present disclosure are applicable to any system employing a hydraulic variator wherein it is desired that the output torque of the variator closely match an expected output torque value. For example, many transmission systems, especially for heavy industrial machines, use components such as constant velocity transmissions that employ a variator and that thus may benefit from application of the teachings herein. In such machines, application of the foregoing teachings can provide better shift performance and an improved user experience due to more precise torque control at the transmission input (i.e., the variator output). Thus, for example, a heavy industrial machine employing such a transmission may be operated for long time periods and in widely varied operating environments without experiencing variator torque-related errors in shift behavior. Thus, although a variator torque-control map may become inaccurate over time and/or across different environments, the shift quality of the associated transmission may nonetheless be maintained through use of the present system.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of controlling an output torque of a variator having a hydraulic actuator responsive to an actuator pressure signal, the method comprising:
   receiving an indication of a first desired torque from an operator interface;
   evaluating a plurality of parameters related to operation of the variator;
   reading a map to link the plurality of parameters to a first mapped value for the actuator pressure signal, wherein the first desired torque is associated with the first mapped value;
   applying the first mapped value to the hydraulic actuator as an actuator pressure signal;
   measuring a first actual output torque of the variator and comparing the first actual output torque to the first desired output torque to derive an error value;
   deriving a supplement value comprising one of a pressure supplement value and a motor torque supplement value based on the error value, wherein deriving a pressure supplement value based on the error value includes multiplying the error value by a gain factor to yield a pressure supplement value;
   receiving an indication of a second desired torque from the operator interface;
   reevaluating the plurality of parameters related to operation of the variator;
   reading the map to link the plurality of variables to a second mapped value for the actuator pressure signal, wherein the second desired torque is associated with the second mapped value;
   modifying the second mapped value via the pressure supplement value to produce an adjusted actuator pressure signal; and
   applying the adjusted actuator pressure signal to the hydraulic actuator to control the output torque of the variator.

2. The method according to claim 1, wherein receiving an indication of a first desired torque from the operator interface includes receiving a signal from an accelerator interface.

3. The method according to claim 1, wherein the actuator pressure signal corresponds to a pressure differential.

4. The method according to claim 3, wherein the actuator pressure signal includes at least two solenoid current signals directed to at least two respective solenoid valves for controlling the actuator.

5. The method according to claim 1, wherein modifying the second mapped value via the pressure supplement value includes adding the pressure supplement value to the second mapped value to produce the adjusted actuator pressure signal.

6. The method according to claim 1, wherein the gain factor is selected from the group consisting of a variable gain value and a static gain value.

7. The method according to claim 1, wherein the variator includes an internal hydraulic circuit, a pump, and a motor, and wherein the plurality of parameters related to operation of the variator include a circuit pressure of the internal hydraulic circuit, a variator pump speed, and a variator motor speed.

8. The method according to claim 7, wherein measuring a first actual output torque of the variator includes converting the circuit pressure to the first actual output torque.

* * * * *